US011448197B2

(12) United States Patent
Sotos Richard et al.

(10) Patent No.: US 11,448,197 B2
(45) Date of Patent: Sep. 20, 2022

(54) MODULAR TOOL (71) Applicant: Siemens Gamesa Renewable Energy A/S, Brande (DK)

(72) Inventors: Marc Artur Sotos Richard, Vejle (DK); Jacob Noergaard, Skive (DK)

(73) Assignee: SIEMENS GAMESA RENEWABLE ENERGY A/S

( * ) Notice: Subject to any disclaimer, the term of this patent is extended or adjusted under 35 U.S.C. 154(b) by 165 days.

(21) Appl. No.: 17/037,116

(22) Filed: Sep. 29, 2020

(65) Prior Publication Data

US 2021/0095643 A1 Apr. 1, 2021

(30) Foreign Application Priority Data

Oct. 1, 2019 (EP) .................................... 19200707

(51) Int. Cl.
*F03D 80/80* (2016.01)
*F03D 13/20* (2016.01)
*B23Q 3/00* (2006.01)
*E04H 12/34* (2006.01)
*B25B 11/00* (2006.01)
*B25B 5/00* (2006.01)

(52) U.S. Cl.
CPC .............. *F03D 80/88* (2016.05); *B23Q 3/00* (2013.01); *B25B 5/00* (2013.01); *F03D 13/20* (2016.05); *B25B 11/00* (2013.01); *E04H 12/342* (2013.01)

(58) Field of Classification Search
CPC .......... F03D 80/88; F03D 13/20; B23Q 3/00; B25B 5/00; B25B 11/00; B25B 11/02; E04H 12/342; Y10T 29/54; Y10T 29/53961; Y10T 29/53983
USPC .............................. 269/289 r, 904, 909, 910
See application file for complete search history.

(56) References Cited

U.S. PATENT DOCUMENTS 9,260,875 B2 * 2/2016 Bjoernskov ............... E04B 1/92

* cited by examiner

*Primary Examiner* — Joseph J Hail
*Assistant Examiner* — Caleb Andrew Holizna
(74) *Attorney, Agent, or Firm* — Schmeiser, Olsen & Watts LLP (57) ABSTRACT Provided is a modular tool for installing a platform into a tower section of a wind turbine tower, comprising a first body element, a second body element, wherein each body element has a first base plate, on which the tower section rests in use of the modular tool, and a second base plate, which rests on a foundation in use of the modular tool, wherein the base plates are spaced apart from each other and are arranged parallel to each other, and at least one connecting beam that detachable connects the body elements to each other and that defines a width of a gap between the body elements. Due to the fact that the at least one connecting beam detachable connects the body elements to each other, the modular tool can be easily adapted to different tower diameters by replacing the at least one connecting beam.

14 Claims, 12 Drawing Sheets

MODULAR TOOL

CROSS-REFERENCE TO RELATED APPLICATIONS

This application claims priority to EP Application No. 19200707.8, having a filing date of Oct. 1, 2019, the entire contents of which are hereby incorporated by reference.

FIELD OF TECHNOLOGY

The following relates to a modular tool for installing a platform into a tower section of a wind turbine tower.

BACKGROUND

Modern wind turbine rotor blades are built from fiber-reinforced plastics. A rotor blade typically comprises an airfoil having a rounded leading edge and a sharp trailing edge. The rotor blade is connected with its blade root to a hub of the wind turbine. The hub is supported in a nacelle and the nacelle is attached to an end of a tower of the wind turbine. The tower consists of a plurality of tower segments that are attached to one another by means of flanges.

Before mounting the tower at the final location of the wind turbine, for example offshore, platforms or other equipment has to be assembled inside the tower sections. For this purpose, project-specific designed stands can be used that can accommodate the geometry of the platforms and the tower sections. However, since these stands are project-specific, they cannot be used for different kinds of platforms and/or tower sections.

SUMMARY

An aspect relates to provide an improved tool for installing a platform into a tower section of a wind turbine tower.

Accordingly, a modular tool for installing a platform into a tower section of a wind turbine tower is provided. The modular tool comprises a first body element, a second body element, wherein each body element has a first base plate, on which the tower section rests in use of the modular tool, and a second base plate, which rests on a foundation in use of the modular tool, wherein the base plates are spaced apart from each other and are arranged parallel to each other, and at least one connecting beam that detachable connects the body elements to each other and that defines a width of a gap between the body elements.

Due to the fact that the at least one connecting beam detachable connects the body elements to each other, the modular tool can be easily adjusted to different tower diameters by replacing the at least one connecting beam. Project-specific designed stands are expendable. This reduces costs and labor when installing the platform. Since there are provided two body elements, the modular tool can be easily transported by dismantling the modular tool into these two body elements.

"Modular" in this context means that the modular tool comprises several reusable modules that can be used without any modification for different tower diameters and/or different kinds of tower sections and/or platforms. Namely, the "modules" of the modular tool are the two body elements. For this reason, the body elements can be named body modules. In contrast to the body elements, the connecting beam is not reused but is newly cut in length for each diameter variation of the tower section. In this way, when switching from one section diameter to another, only the connecting beam needs to be replaced which is very cost-efficient and does not need a lot of labor. A length of the connecting beam defines the width of the gap. "Defining" in this context means that the width of the gap is proportional to the length of the connecting beam. Thus, a longer connecting beam means a wider gap.

The connecting beam can be an I-beam, for example. The connecting beam is not welded to the body elements but bolted to them. This enables an easy exchange of the connecting beam. "Detachable" in this context means that the connecting beam can be easily removed from the modular tool. As mentioned before, this can be achieved by means of a bolted connection between the connecting beam and the body elements. There can be provided more than one connecting beam. There are provided at least two connecting beams that are spaced apart from one another. However, there can also be provided three or more than three connecting beams.

In particular, the body elements are identical. The body elements can be designed mirror-inverted. The two body elements together form a ring-shaped main body of the modular tool that carries the tower section. In this way, the modular tool spaces away the tower section from the foundation. However, the body elements do not contact each other directly because the gap is arranged between the body elements. The main body can have a height of 1 m. Hence, a space between the tower section and the foundation can have a height of 1 m. This enables an easy access of the tower section. Through the gap that spaces the body elements apart, an interior of the tower section can be reached for assembling purposes.

The modular tool has a coordinate system with an x-direction or width direction, an y-direction or depth direction and a z-direction or height direction. The directions are positioned rectangular to each other. In particular, the base plates of the body elements are spaced apart from each other along the height direction. The tower section is lifted onto the modular tool along the height direction. A crane can be used for this purpose. The tower section needs to be adjusted in the width direction and in the depth direction when being or after being placed on the modular tool. This can be done by means of the modular tool itself as will be explained later.

The platform rests on the modular tool for installing it into the tower section. The platform is received in the interior of the tower section. The platform can be a low voltage platform (LVP). The platform can comprise a frame that supports components like cabinets, control boxes or the like. An integration system can be used for integrating the platform into the tower section. The integration system can have pivotable legs that support the platform. The foundation can be a concrete foundation, in particular a cast concrete plate. The tower section can be a bottom tower section of a tower of a wind turbine. The tower can be named wind turbine tower. The tower has a plurality of tower sections that are attached to each other. The tower section rests on the modular tool with an annular flange.

According to an embodiment, the body elements are arc-shaped. In particular, the base plates are arc-shaped. The body elements can have a circular shape. This means that the body elements can be part of a circular geometry.

According to a further embodiment, each body element comprises a plurality of beams that connect the base plates to each other. The beams run along the height direction and space the base plates away from another in the height direction. The beams can be named vertical beams. The vertical beams can comprise I-beams, U-beams, hollow box profiles or the like. The vertical beams can also be used as receiving elements for a forklift. The base plates can have breakthroughs or openings that can also receive a forklift. This facilitates the transport of the body elements. The vertical beams can also carry the loads of the tower section and the platform.

According to a further embodiment, each body element has a plurality of beams that are arranged framework-shaped, wherein the at least one connecting beam connects two of these beams together. The latter beams can be named horizontal beams because they are arranged in a plane that is spanned by the width direction and the depth direction. The body elements comprising the horizontal beams can have a D-shape. The horizontal beams can be connected to the vertical beams of the body elements. The horizontal beams can be I-beams.

According to a further embodiment, the modular tool further comprises tower bumpers for guiding the tower section when lowering it to the modular tool, wherein the tower bumpers protrude over the body elements in a height direction of the modular tool. In particular, there are provided at least three tower bumpers. There are provided four tower bumpers. The tower bumpers are attached to the body elements. The tower bumpers are bolted to the body elements. In this way, the tower bumpers can be easily exchanged. Each body element can have two tower bumpers.

According to a further embodiment, the modular tool further comprises support struts for supporting the platform, wherein the support struts protrude over the body elements in the height direction. There are provided four support struts. The support struts can have bolts that are received in bores or openings that are provided in the platform.

According to a further embodiment, the tower bumpers protrude further over the body elements than the support struts. In this way, a collision of the tower section with the support struts and/or the platform is omitted when lowering the tower section on the modular tool.

According to a further embodiment, the support struts are adjustable in the height direction, in a width direction and/or in a depth direction of the modular tool. This enables an adjustment of the platform relatively to the tower section. The height direction can be adjusted manually or hydraulically. Hence, the support struts can be hydraulic support struts.

According to a further embodiment, the modular tool further comprises a skidding system for adjusting the support struts in the depth direction. In particular, the support struts are part of the skidding system. The skidding system enables a linear movement of the support struts along the depth direction. The skidding system itself or a part of the skidding system is movable along two parallel horizontal beams of the body elements. These horizontal beams run along the depth direction. In particular, the skidding system itself or a part of the skidding system is movable along the depth direction.

According to a further embodiment, the skidding system comprises a frame, that carries the support struts and that is supported by means of the body elements, and an actuation device for moving the frame along the depth direction. The frame is supported by means of the afore-mentioned horizontal beams of the body elements. The frame can be supported by means of low friction pads, in particular made of polytetrafluoroethylene (PTFE). The actuation device can comprise a leadscrew which engages with a nut or the like that is attached to the frame of the skidding system. An actuator, in particular a manual actuator, is connected to the leadscrew. The actuator can be a crank-handle. By rotating the leadscrew, the frame with the support struts moves along the depth direction as desired. The leadscrew can also be rotated electrically or hydraulically. However, it is desirable that the actuation device is actuated manually, with the objective to find a low-tech and low-complexity solution, minimizing the risk of failures and maintenance.

According to a further embodiment, the modular tool further comprises pivotable adjustment devices on which the tower section rests in use of the modular tool. Each adjustment device can comprise a triangle-shaped adjustment plate that is rotationally fixed to the base plate that faces the tower section. The adjustment plate can have an arched notch that receives a bolt. The adjustment plate can be rotated. When in the desired position, the adjustment plate can be fixed by means of the bolt. There can be provided four adjustment devices. Each body element can have two adjustment devices.

According to a further embodiment, each adjustment device comprises an adjustable bolt that can be received in a flange of the tower section. The adjustment plate also has a linear notch that receives the latter bolt. The bolt can be moved linear along the notch. The bolt can be received in a bore that is provided in the flange of the tower section. Each adjustment device can be used to position the assigned bolt in the width direction and in the depth direction. In use of the modular tool, the flange of the tower section rests on the adjustment devices.

According to a further embodiment, the modular tool further comprises a sliding guide system that allows a linear movement of the tower section relatively to the modular tool. The sliding guide system can be placed between the body elements in the gap. In particular, the linear movement is along the depth direction. The sliding guide system can be a plate with at least one notch. There are provided two parallel notches. The flange of the tower section can receive bolts. These bolts are received in the notches of the sliding guide system when lowering the tower section on the modular tool. The tower section can be positioned linear along the sliding guide system once being placed on the modular tool.

According to a further embodiment, the modular tool further comprises stairs that are reachable through the gap. The stairs are arranged in the gap. The stairs can be attached to the connecting beam.

According to a further embodiment, the modular tool further comprises a walking platform that is arranged between the base plates. Seen in the height direction, the walking platform is placed between the base plates of the body elements. The walking platform can comprise metal grids or can be a metal grid. The walking platform can be reached by means of the stairs. The walking platform can rest on the horizontal beams and/or on the connecting beam.

Further possible implementations or alternative solutions of embodiments of the invention also encompass combinations—that are not explicitly mentioned herein—of features described above or below with regard to the embodiments. The person skilled in the art may also add individual or isolated aspects and features to the most basic form of embodiments of the invention.

BRIEF DESCRIPTION

Some of the embodiments will be described in detail, with reference to the following figures, wherein like designations denote like members, wherein.

In the Figures, like reference numerals designate like or functionally equivalent elements, unless otherwise indicated.

DETAILED DESCRIPTION

Figure 1:
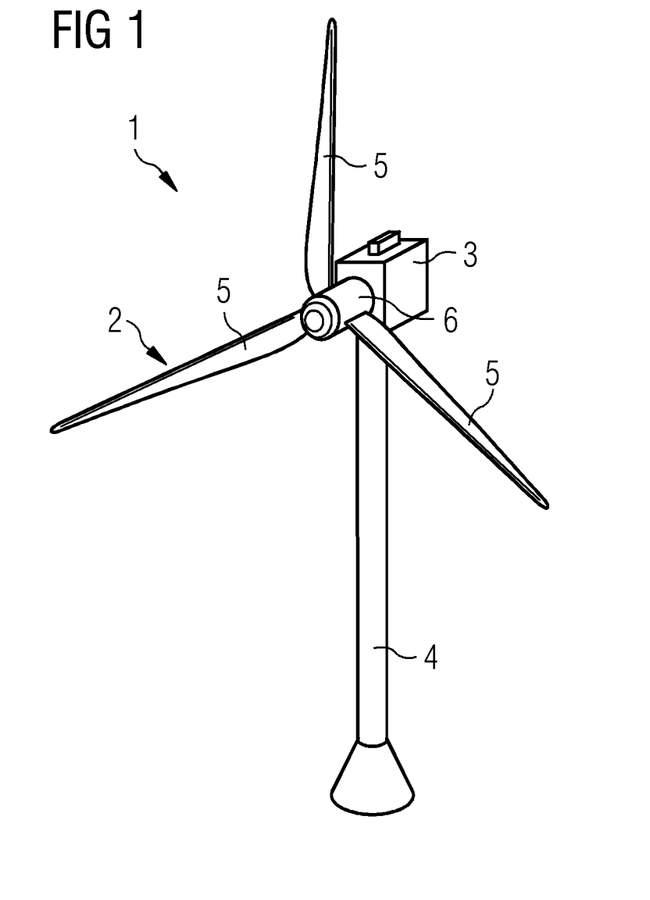
FIG. 1 shows a perspective view of a wind turbine according to one embodiment.

FIG. 1 shows a wind turbine 1 according to one embodiment.

The wind turbine 1 comprises a rotor 2 connected to a generator (not shown) arranged inside a nacelle 3. The nacelle 3 is arranged at the upper end of a tower 4 of the wind turbine 1. The tower 4 has a plurality of tower sections that are arranged on top of each other. The tower 4 can be named wind turbine tower.

The rotor 2 comprises three rotor blades 5. The rotor blades 5 are connected to a hub 6 of the wind turbine 1. Rotors 2 of this kind may have diameters ranging from, for example, 30 to 160 meters or even more. The rotor blades 5 are subjected to high wind loads. At the same time, the rotor blades 5 need to be lightweight. For these reasons, rotor blades 5 in modern wind turbines 1 are manufactured from fiber-reinforced composite materials. Therein, glass fibers are generally more desirable over carbon fibers for cost reasons. Oftentimes, glass fibers in the form of unidirectional fiber mats are used.

Figure 2:
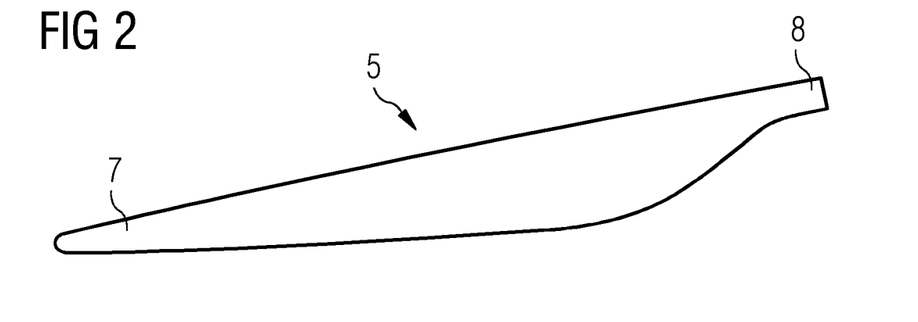
FIG. 2 shows a perspective view of a wind turbine rotor blade according to one embodiment.

FIG. 2 shows a rotor blade 5 according to one embodiment.

The rotor blade 5 comprises an aerodynamically designed portion 7, which is shaped for optimum exploitation of the wind energy and a blade root 8 for connecting the rotor blade 5 to the hub 6.

Figure 3:
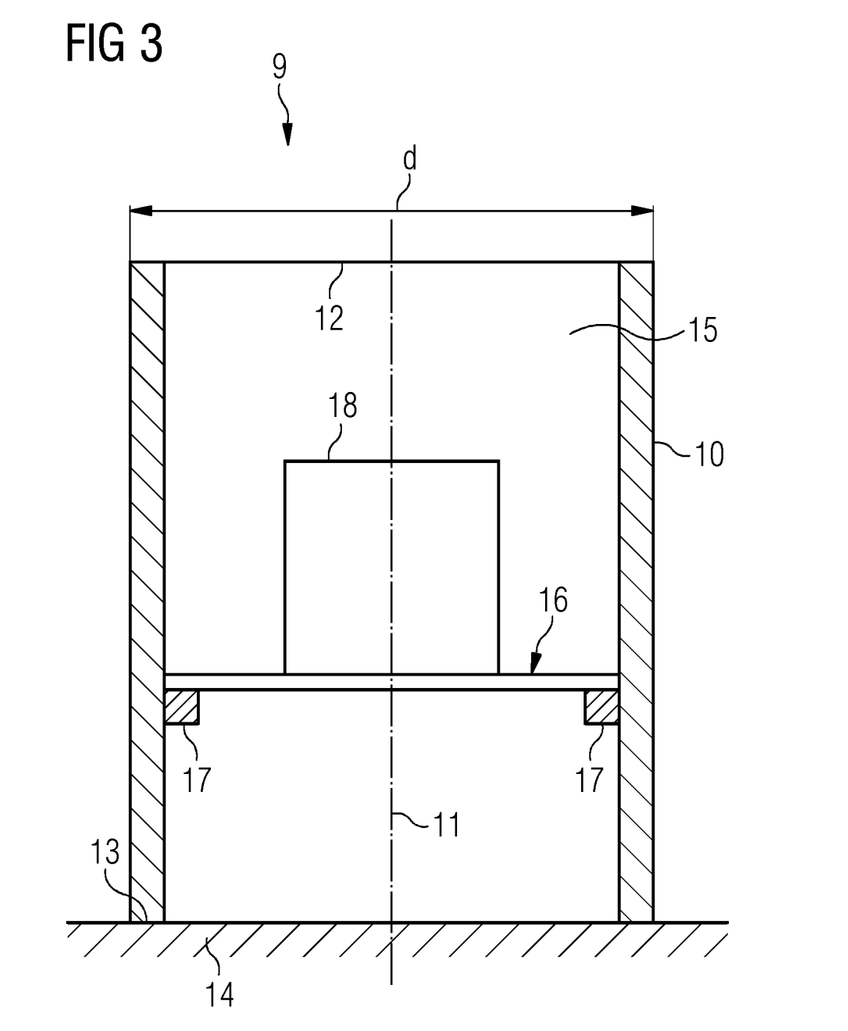
FIG. 3 shows a cross-sectional view of a tower section according to one embodiment.

FIG. 3 shows a tower section 9 for the tower 4 according to one embodiment.

The tower section 9 can be any tower section. However, FIG. 3 shows a bottom tower section. For this reason, the tower section 9 can be named bottom tower section. As mentioned before, the tower 4 has a plurality of tower sections 9 that are stacked on the tower section 9. The tower section 9 can have a cylindrical shape. The tower section 9 has a circumferential wall 10. The circumferential wall 10 is constructed rotation-symmetric towards a middle axis or symmetry axis 11. The tower section 9 has a diameter d. The diameter d is an outer diameter of the tower section 9.

The tower section 9 further has an upper flange or first flange 12 to which a further tower section (not shown) is connected. The tower section 9 also has a bottom flange or second flange 13 which is placed on a foundation 14. The circumferential wall 10 encloses an interior 15 of the tower section 9. The foundation 14 can be a concrete foundation.

The tower section 9 further comprises a platform 16 which is integrated into the tower section 9 by means of an integration system 17. The platform 16 can be a low voltage platform (LVP). The integration system 17 can be a welded or bolted connection. The integration system 17 can comprise pivotable legs that are attached to the tower section 9 and are suitable for supporting the platform 16. The platform 16 can comprise electric and/or electronic components 18. The components 18 can include generators, cabinets, control boxes or the like. The platform 16 is spaced apart from the foundation 14.

Figure 4:
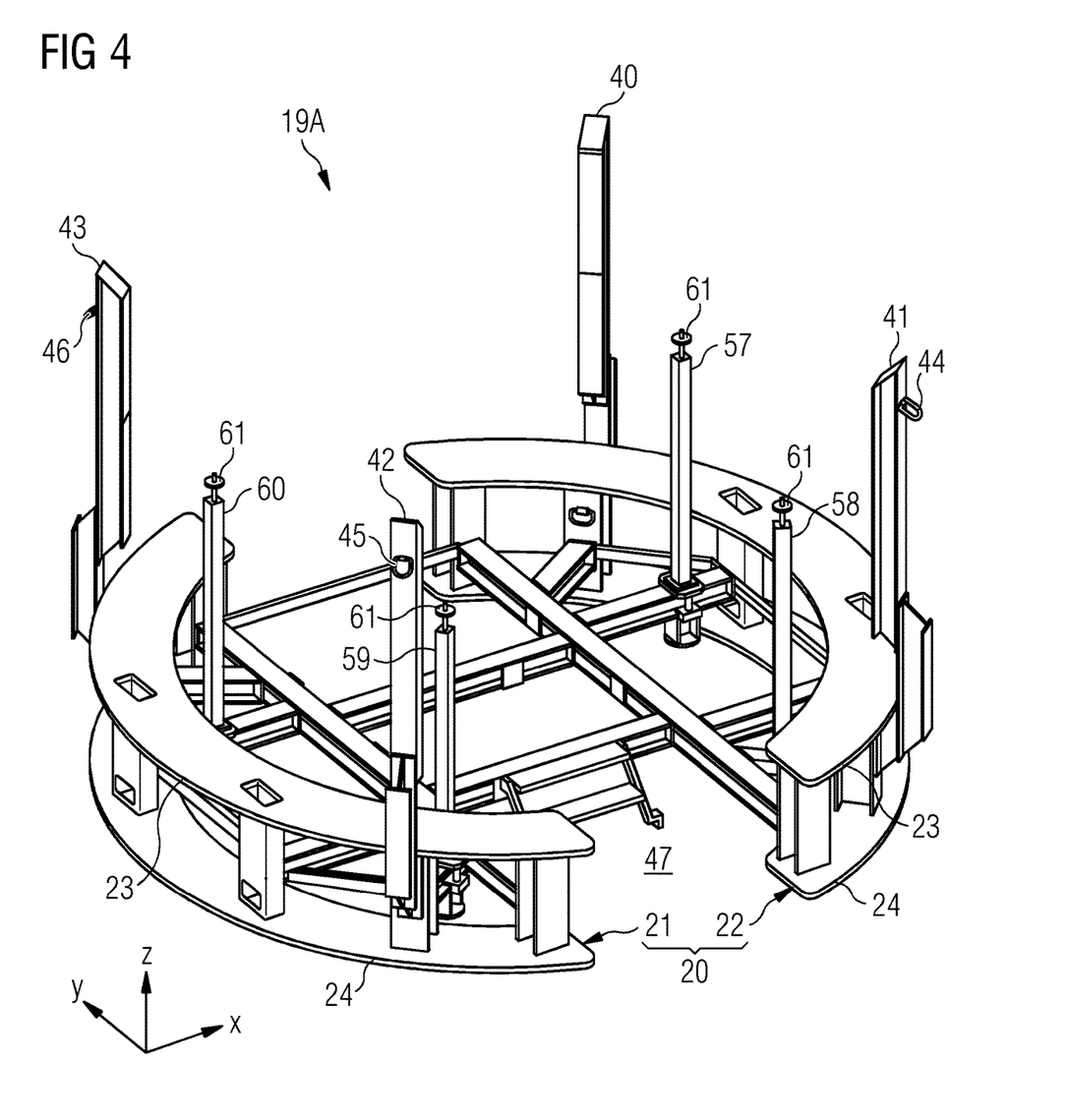
FIG. 4 shows a perspective view of a modular tool according to one embodiment.
Figure 5:
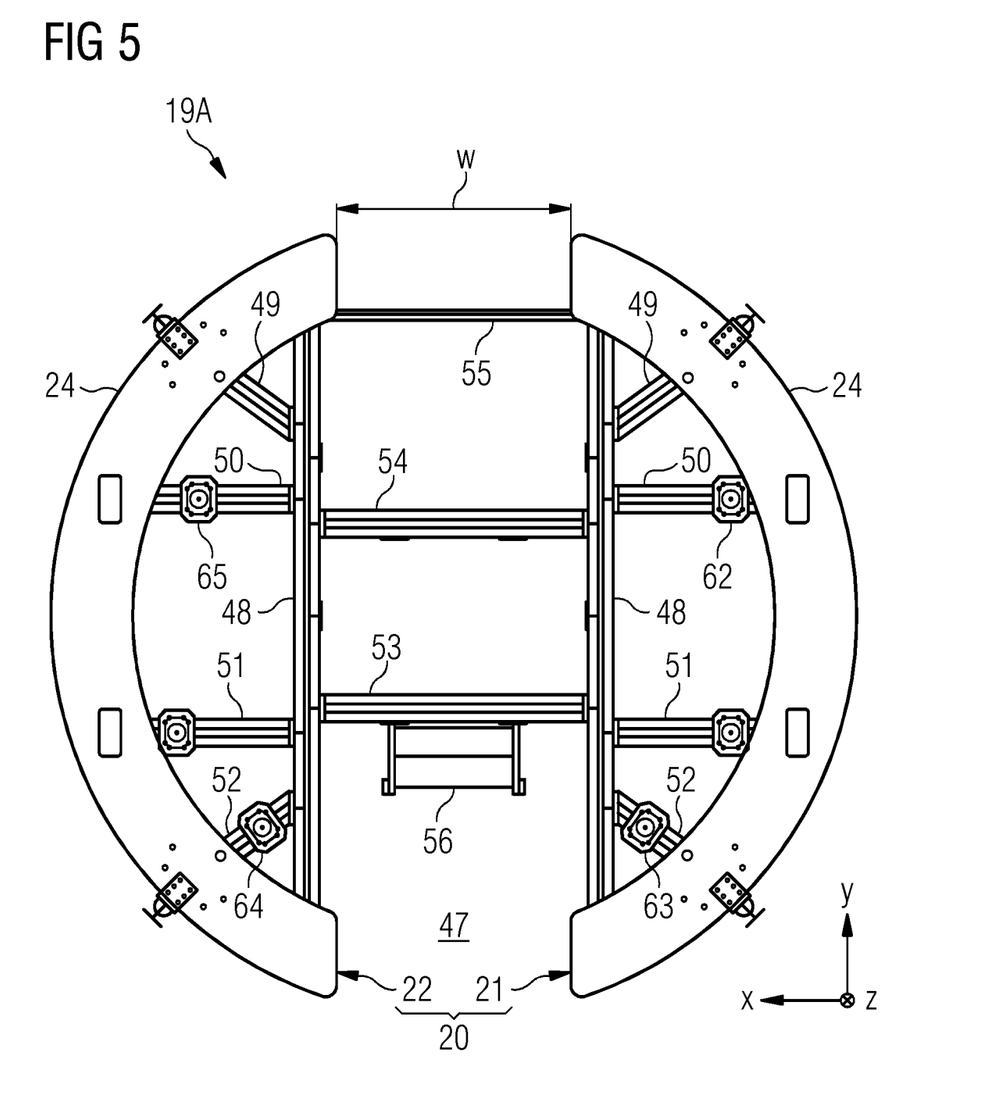
FIG. 5 shows a bottom view of the modular tool according to FIG. 4.

FIGS. 4 and 5 both show a modular tool 19A for integrating the platform 16 into the tower section 9 according to one embodiment.

The modular tool 19A has a coordinate system with an x-direction or width direction x, an y-direction or depth direction y and a z-direction or height direction z. The directions x, y, z are arranged perpendicular to each other.

Figure 6:
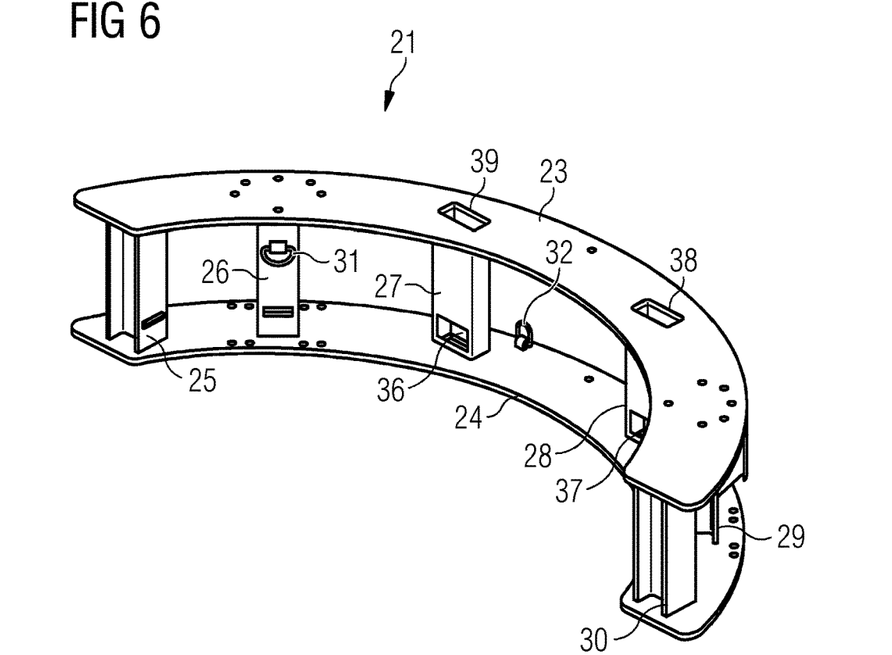
FIG. 6 shows a perspective view of a body elements according to one embodiment.
Figure 7:
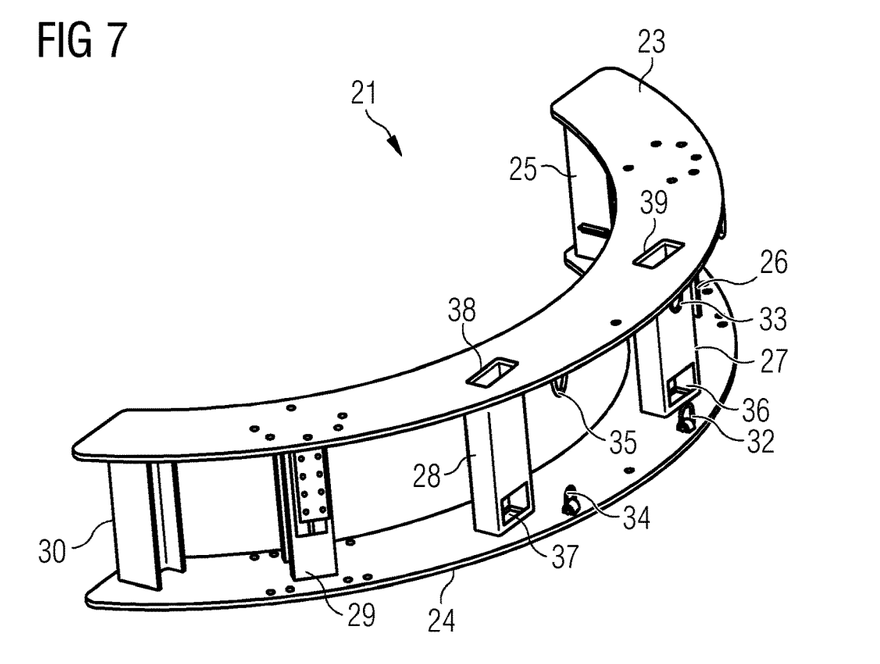
FIG. 7 shows another perspective view of the body element according to FIG. 6.

The modular tool 19A has a ring-shaped main body 20 which is split into two body elements 21, 22 (FIGS. 6 and 7). There are provided a first body element 21 and a second body element 22. The modular tool 19A allows the flange 13 to be spaced apart from the foundation 14 when installing the platform 16. Both body elements 21, 22 are identical but mirror-inverted. For this reason, in the following only the body element 21 is referred to. In the height direction z, the body elements 21, 22 can have a height of 1 m.

The body element 21 is a welded component. The body element 21 has a semi-circular shape and comprises a first base plate 23 and a second base plate 24. The base plates 23, 24 are crescent-shaped. The base plates 23, 24 are arranged parallel to each other and spaced apart from each other. The base plates 23, 24 are connected to each other by means of a plurality of beams 25 to 30. The beams 25 to 30 can comprise I-beams, U-beams, hollow box profiles or the like. The beams 25 to 30 can be welded to the base plates 23, 24 to connect them. The beams 25 to 30 run along the height direction Z. The beams 25 to 30 can be named vertical beams because they run along the height direction z.

The body element 21 comprises a plurality of lifting accessories 31 to 35. The lifting accessories 31 to 35 can comprise eyes, hooks or the like. The lifting accessories 31 to 35 are used for transport lashing or lifting and handling of the body element 21. Slings or chains can be attached to the lifting accessories 31 to 35 for these purposes.

The beams 27, 28 can have openings 36, 37. Also the base plates 23, 24 can have openings 38, 39. The openings 38, 39 open into the beams 27, 28. The openings 36 to 39 can be used for handling the body element 21 by means of a forklift. The beams 26, 29 support the tower section 9. The beams 25, 30 support the platform 16. The beams 27, 28 are non-structural beams. The beams 27, 28 serve in a functional purpose in handling, lifting, and securing the body elements 21, 22 or the modular tool 19A during mobilization.

Now turning back to FIGS. 4 and 5, the modular tool 19A comprises a plurality of tower bumpers 40 to 43. The tower bumpers 40 to 43 are suitable for guiding the tower section 9 when placing it on the body elements 21, 22. The number of tower bumpers 40 to 43 is arbitrary. However, there are at least three tower bumpers 40 to 43. As can be seen from FIG. 4, there can be provided four tower bumpers 40 to 43. The tower bumpers 40 to 43 are evenly distributed around a circumference of the main body 20.

The tower bumpers 40 to 43 are attached to the body elements 21, 22, in particular to the beams 26, 29. The tower bumpers 40 to 43 are bolted to the body elements 21, 22. In this way, the tower bumpers 40 to 43 are exchangeable. Each tower bumper 40 to 43 can have a lifting accessory 44 to 46 like an eye, a hook or the like. The lifting accessories 44 to 46 can be used for lifting the modular tool 19A.

The height of the tower bumpers 40 to 43 along the height direction z can be determined either by the height at which the components 18 are at risk of collision with any element of the tower section 9, primarily the integration system 17, or by extending the height of the tower bumpers 40 to 43 all the way up until the maximum height of the platform 16 would completely eliminate the risk of a collision between the tower section 9 and the platform 16. However, the latter could also introduce the risk of instability of the modular tool 19A if the tower section 9 would impact the tower bumpers 40 to 43. This is due to the great lever arm.

The body elements 21, 22 are spaced apart from each other so that there is provided a gap 47 between the two body elements 21, 22. The gap 47 leads to an improved performance in terms of access and egress, both in the view of emergency and rescue extraction, and also in handling components to the inside of the modular tool 19A, which can be lifted by forklift and placed on a working area of the modular tool 19A from the outside. The gap 47 has a width w. The width w is adjustable as will be explained later.

Each body element 21, 22 has a horizontal beam 48 that connects the beams 25, 30 to each other. In this way, the body elements 21, 22 both can have a D-shape. The beams 48 run along the depth direction y. The beams 25, 30, 48 can be bolted or welded together. The beam 48 is connected to the beams 26 to 29 by means of beams 49 to 52. The beams 48 to 52 form a framework which is part of the body elements 21, 22. The beams 48 to 52 can be named horizontal beams because they are arranged in a plane that is spanned by the width direction x and the depth direction y. In particular, the beams 48 to 52 are arranged perpendicular to the height direction z.

The body elements 21, 22, in particular the two beams 48 of the body elements 21, 22, are connected to each other by means of beams 53 to 55. The beams 53 to 55 can be named connecting beams. A length of the beams 53 to 55 defines the width w of the gap 47. The beams 53 to 55 are cut to length individually for each application of the modular tool 19A, whereas the body elements 21, 22 can be used as modules for a variety of different applications. The beams 53 to 55 are bolted to the beams 48 so that the beams 53 to 55 can be easily exchanged for different applications of the modular tool 19A.

The modular tool 19A further can have stairs 56 that are attached to the beam 53. The stairs 56 can be reached through the gap 47. A working area, for example in the form of a metal grid, can be placed on the beams 48 to 55. The working area can be reached by climbing the stairs 56. The beams 48 to 55 are paced between the base plates 23, 24 of the body elements 21, 22 when seen in the height direction z. The beams 48 to 55 can be placed closer to the second base plate 24 than to the first base plate 23. When the modular tool 19A is arranged on the foundation 14, the beams 48 to 55 are spaced apart from the foundation 14.

The modular tool 19A further has support struts 57 to 60 for supporting the platform 16. There are provided four support struts 57 to 60. Correct placement of the platform 16 is ensured by means of guide pins that protrude through holes at a frame of the platform 16. Each support strut 57 to 60 can have an adjustment element 61. The adjustment elements 61 can be used for a horizontal adjustment of the platform 16. The adjustment elements 61 can be manual adjustment elements, for example in the form of screws and nuts. The adjustment elements 61 also can be hydraulic adjustment elements.

The support struts 57 to 60 are part of the body elements 21, 22. However, the support struts 57 to 60 are detachable from the body elements 21, 22 so that the support struts 57 to 60 can be exchanged. The support struts 57 to 60 can be bolted to the body elements 21, 22. The support struts 57 to 60 are bolted to the beams 50, 52. The support struts 57 to 60 can be moved linear along the beams 50, 52 for adjusting their position.

Along the height direction z, the support struts 57 to 60 protrude over the body elements 21, 22. However, the tower bumpers 40 to 43 protrude over the support struts 57 to 60. Each support strut 57 to 60 is assigned to a corresponding post 62 to 65. The posts 62 to 65 are attached to the beams 50, 52 of the body elements 21, 22. When seen in the height direction z, the posts 62 to 65 are positioned on the same height as the second base plates 24 of the two body elements 21, 22. That means that the posts 62 to 65 rest on the foundation 14.

The function of the modular tool 19A is explained in the following. Firstly, the modular 19A is assembled at the construction site. The body elements 21, 22 are connected together by means of the beams 53 to 55. The tower bumpers 40 to 43 and the support struts 57 to 60 are mounted. The modular tool 19A can be mounted on the foundation 14 or placed on the foundation 14. The modular tool 19A can be transported by means of a fork lift.

The platform 16 is then placed on the support struts 57 to 60. This can be done by means of a forklift. The platform 16 can be adjusted by means of the adjustment elements 61 of the support struts 57 to 60. The tower section 9 is then lowered to the modular tool 19A by means of a crane or the like. The lowering can be monitored sideways without the observer being placed directly under the tower section 9.

As the tower bumpers 40 to 43 protrude over the support struts 57 to 60, the tower section 9 is guided by means of the tower bumpers 40 to 43 without colliding with the platform 16. The tower section 9 is lowered until it rests on the two body elements 21, 22. The interior 15 of the tower section 9 is now reachable through the gap 47 for attaching the platform 16 to the tower section 9 by means of the integration system 17. As soon as the platform 16 is attached to the tower section 9, the tower section 9 is lifted together with the platform 16 from the modular tool 19A. The modular tool 19A or at least the body elements 21, 22 thereof can be reused.

Figure 8:
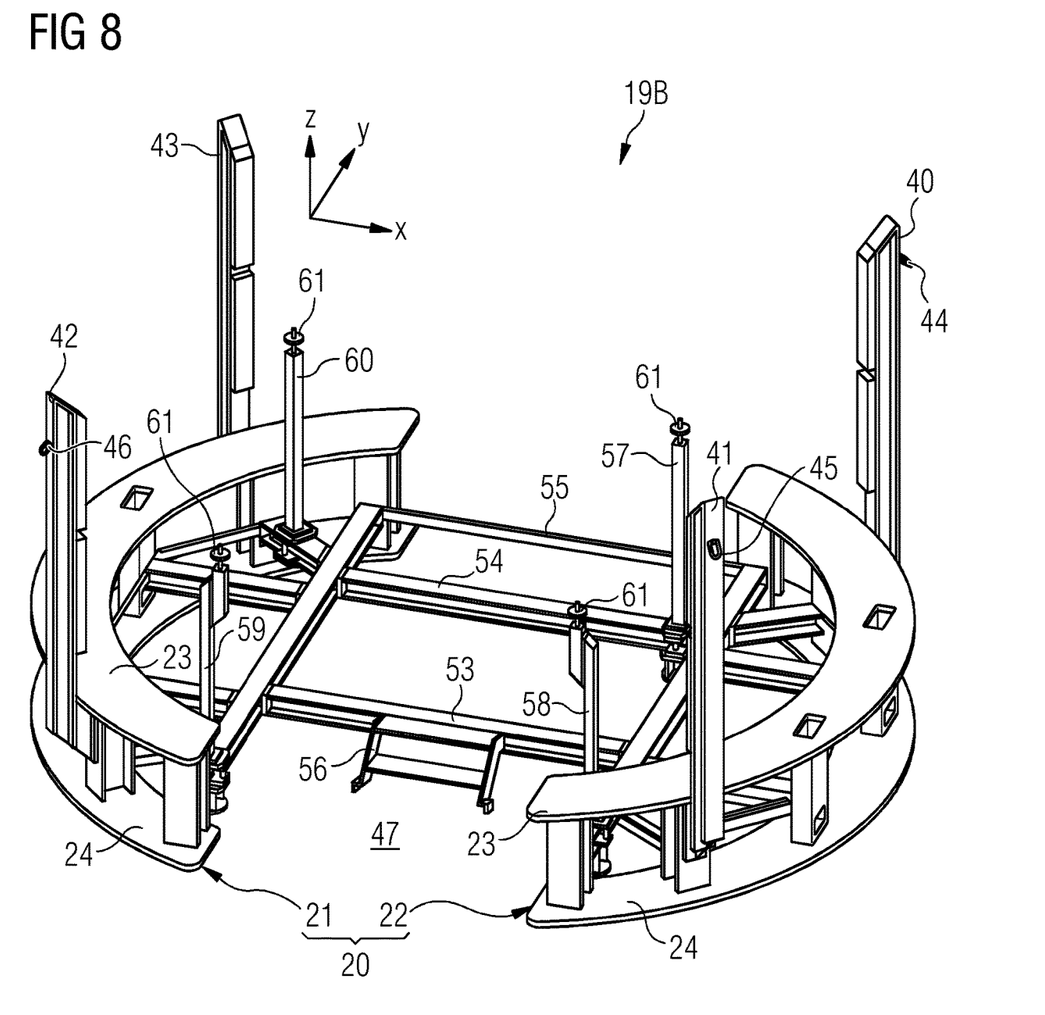
FIG. 8 shows a perspective view of a modular tool according to another embodiment.

FIG. 8 shows a modular tool 19B according to another embodiment.

The modular tool 19B differs from the modular tool 19A only in that the beams 53 to 55 are longer so that the width w of the gap 47 is bigger. The body elements 21, 22 are the same as with the modular tool 19A. Compared to the modular tool 19A, the modular tool 19B can be used for tower sections 9 with lager diameters d.

Figure 9:
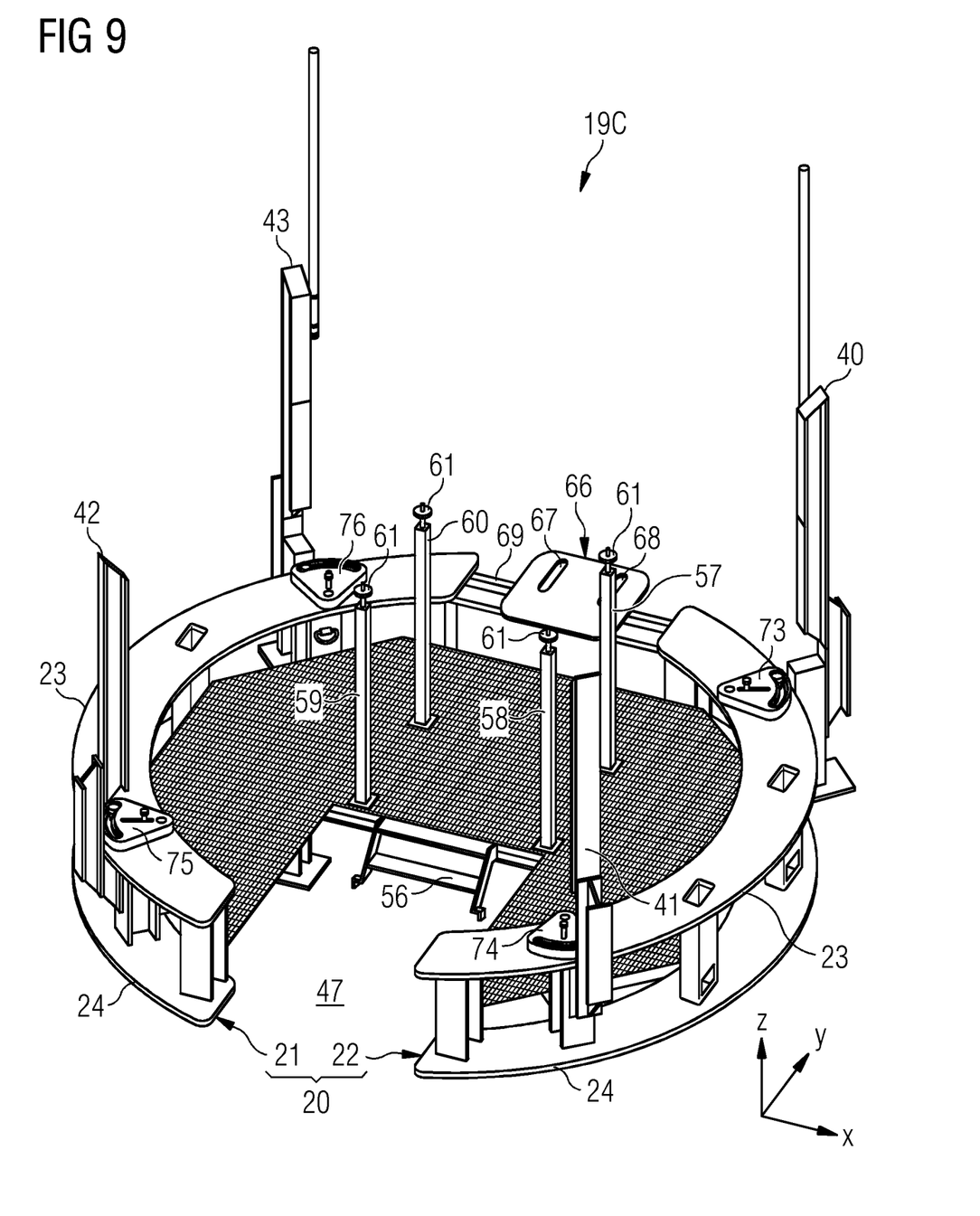
FIG. 9 shows a perspective view of a modular tool according to another embodiment.
Figure 10:
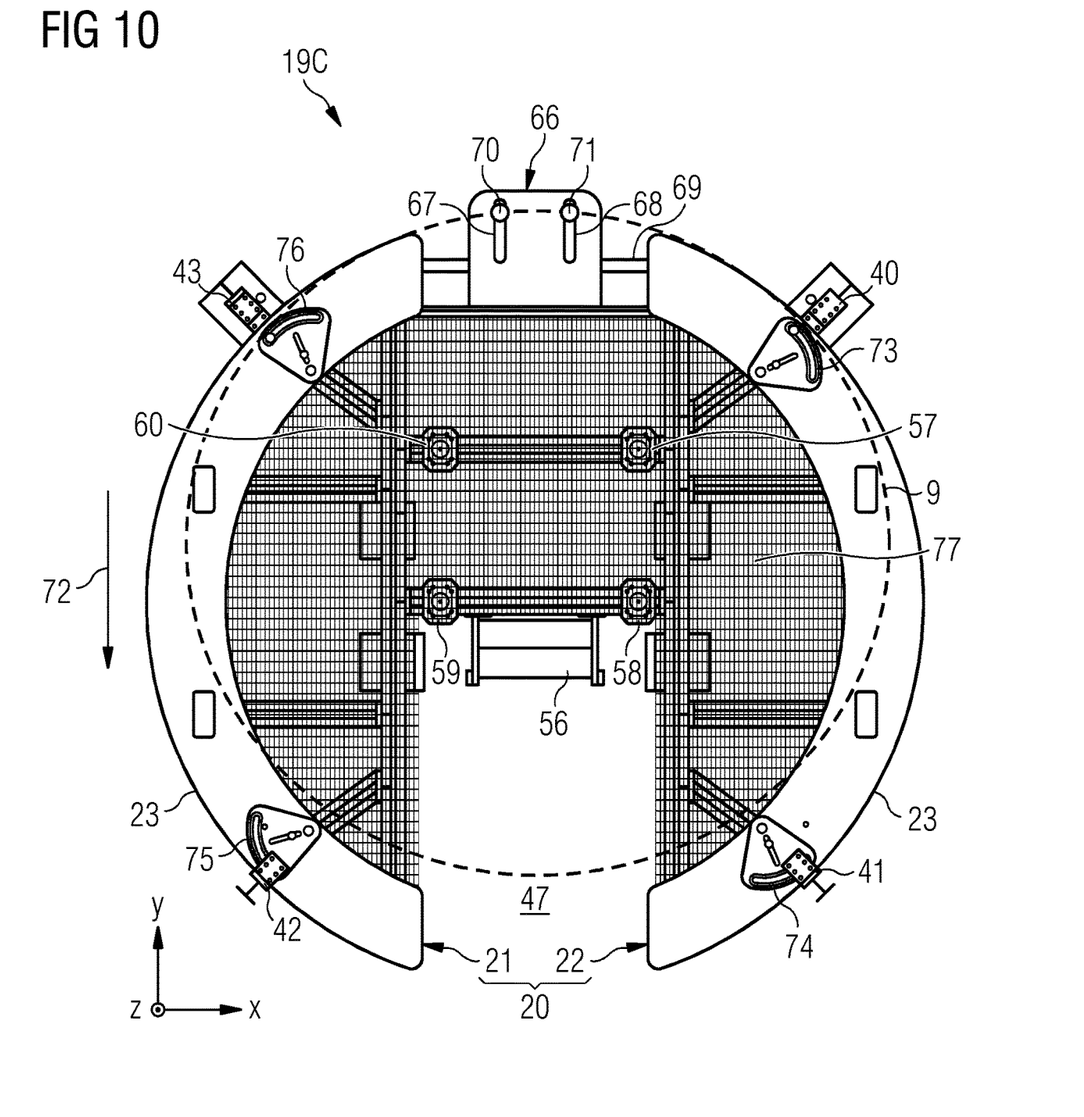
FIG. 10 shows a top view of the modular tool according to FIG. 9.

FIGS. 9 and 10 both show a modular tool 19C according to another embodiment.

As basic components, the modular tool 19C has the body elements 21, 22 as explained before. The modular tool 19C differs from the modular tool 19A in that the modular tool 19C has an optional sliding guide system 66. The sliding guide system 66 is plate-shaped and is arranged between the body elements 21, 22. The sliding guide system 66 can be a steel plate.

The sliding guide system 66 has two notches 67, 68 that run along the depth direction y. The sliding guide system 66 is attached to the body elements 21, 22 by means of a beam 69 that connects the body elements 21, 22 with each other. The modular tools 19A, 19B can also be equipped with such a sliding guide system 66.

The notches 67, 68 are suitable for receiving two bolts 70, 71 that protrude from the flange 13 of the tower section 9. The integration system 17 has installation legs on the circumferential wall 10 that are suitable for engaging with the platform 16. Due to the proximity of the installation legs to the platform 16, narrow clearances are expected and therefore the sliding guide system 66 for the tower section 9 is required to mitigate the risk of collision during zig-zag landing.

The bolts 70, 71 are received in the notches 67, 68 of the sliding guide system 66 when lowering the tower section 9 on the modular tool 19C. Once being placed on the modular tool 19C, the tower section 9 can be positioned linear along the sliding guide system 66 as indicated by means of an arrow 72.

The modular tool 19C has optional adjustment devices 73 to 76 on which the flange 13 of the tower section 9 rests. The number of adjustment devices 73 to 76 is arbitrary. For example, each body element 21, 22 has two adjustment devices 73 to 76. The modular tools 19A, 19B can also have these kinds of adjustment devices 73 to 76. The adjustment devices 73 to 76 can be used for adjusting the position of the tower section 9. The adjustment devices 73 to 76 are all designed identical. The modular tool 19C has a walking platform 77, for example a metal grid. The walking platform 77 is accessible by means of the stairs 56. The modular tools 19A, 19B can have a walking platform 77 of that kind too.

Figure 11:
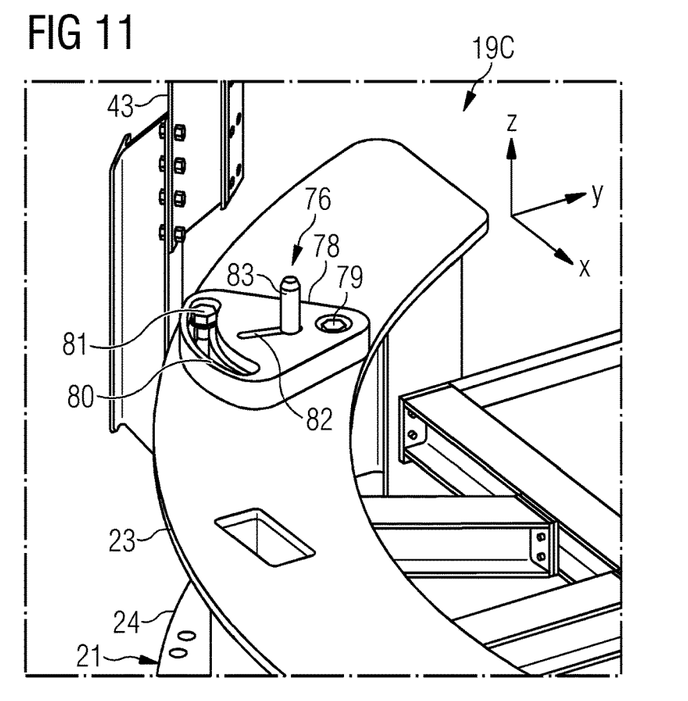
FIG. 11 shows a partial perspective view of the modular tool according to FIG. 9.
Figure 12:
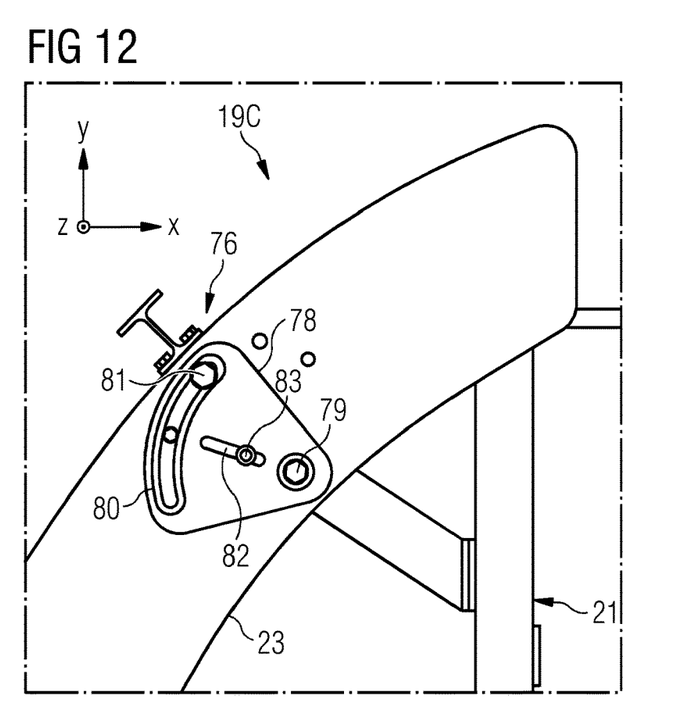
FIG. 12 shows a partial top view of the modular tool according to FIG. 9.

As can be seen from FIGS. 11 and 12 at the example of the adjustment device 76, the adjustment device 76 comprises a triangle-shaped adjustment plate 78 that is rotationally fixed to the first base plate 23 by means of a bolt 79. The adjustment plate 78 has an arched notch 80 that receives a bolt 81. The bolt 81 can be a screw. The notch 80 is stepped so that a head of the bolt 81 can be received in the notch 80. In that way, the head does not protrude over the notch 80.

The adjustment plate 78 can be rotated around the bolt 79. When in the desired position, the adjustment plate 78 can be fixed by means of the bolt 81. The adjustment plate 78 also has a linear notch 82 that receives a bolt 83. The notch 82 runs from the bolt 79 in direction of the notch 80. The bolt 83 can be moved linear along the notch 82. The bolt 83 can be received in a bore that is provided in the flange 13 of the tower section 9. The adjustment device 76 can be used to position the bolt 83 in the width direction x and in the depth direction y. In use of the modular tool 19C, the flange 13 rests on the adjustment devices 73 to 76.

Figure 13:
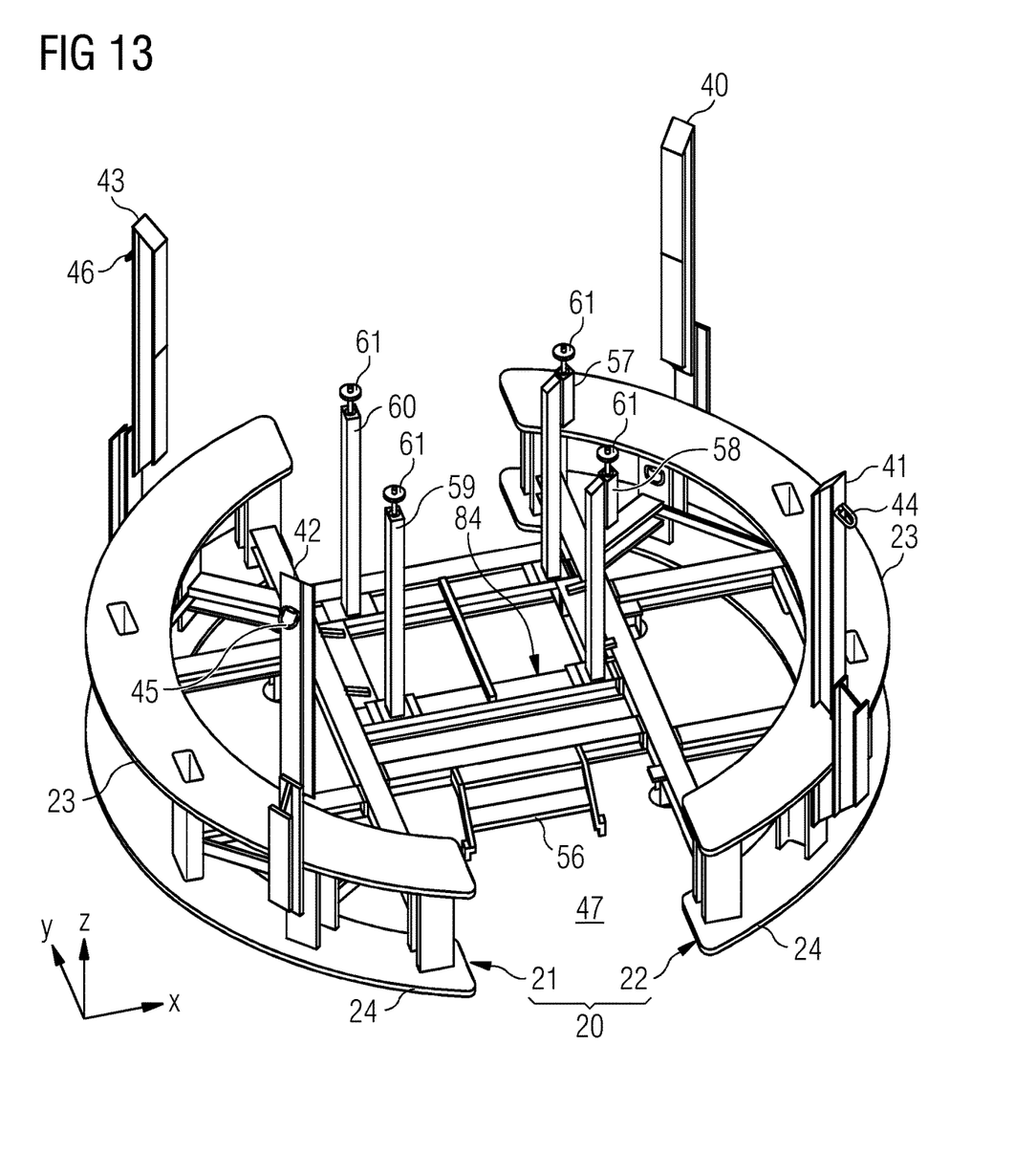
FIG. 13 shows a perspective view of a modular tool according to another embodiment.

FIG. 13 shows a modular tool 19D according to another embodiment.

The modular tool 19D has the two body elements 21, 22, designed as mentioned before. The modular tool 19D also can have the sliding guide system 66 and/or the adjustment devices 73 to 76 (not shown). The modular tool 19D differs from the modular tool 19A in that it has a skidding system 84. The support struts 57 to 60 are part of the skidding system 84. The skidding system 84 is based on a "sledge" concept which slides the support struts 57 to 60 as one entity along the beams 48 of the body elements 21, 22 in the depth direction y. The movement is done below the walking platform 77 (not shown). The skidding system 84 can also be used with the modular tools 19A, 19B, 19C.

Figure 14:
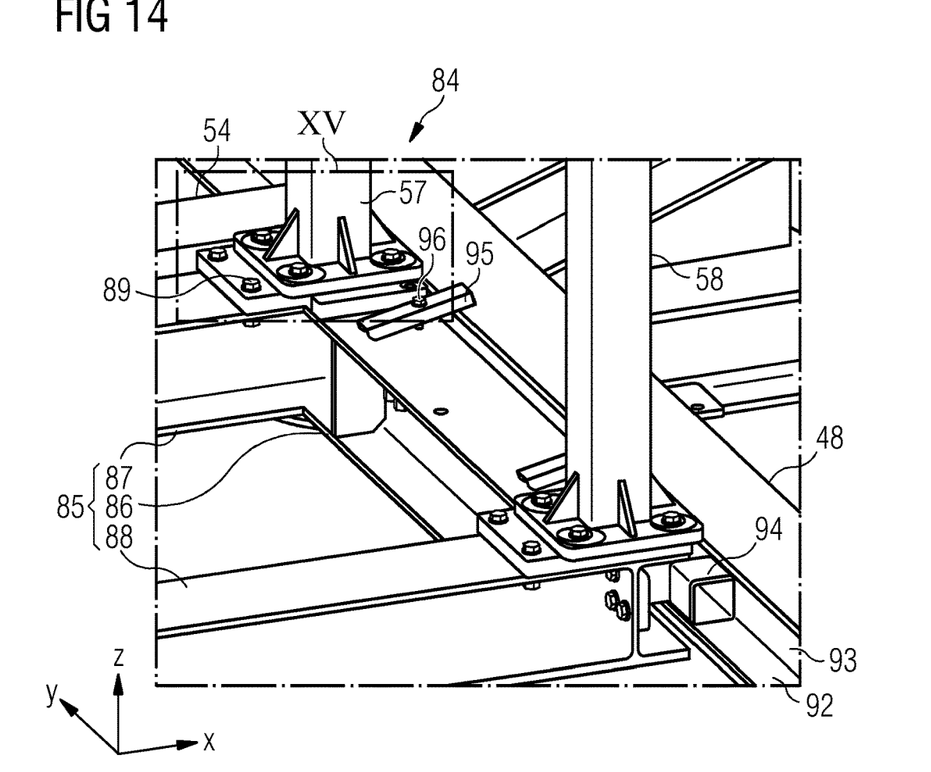
FIG. 14 shows a partial perspective view of a skidding system according to one embodiment.

As can be seen from FIG. 14, apart from the support struts 57 to 60, the skidding system 84 comprises a rectangular frame 85 which has two longitudinal beams 86 (only one is shown in FIG. 14) and two transverse beams 87, 88. The frame 85 is placed between the beams 48 of the two body elements 21, 22. The support struts 57 to 60 are attached to the frame 85 by means of bolts 89 of which only one has a reference sign in FIG. 14.

Figure 15:
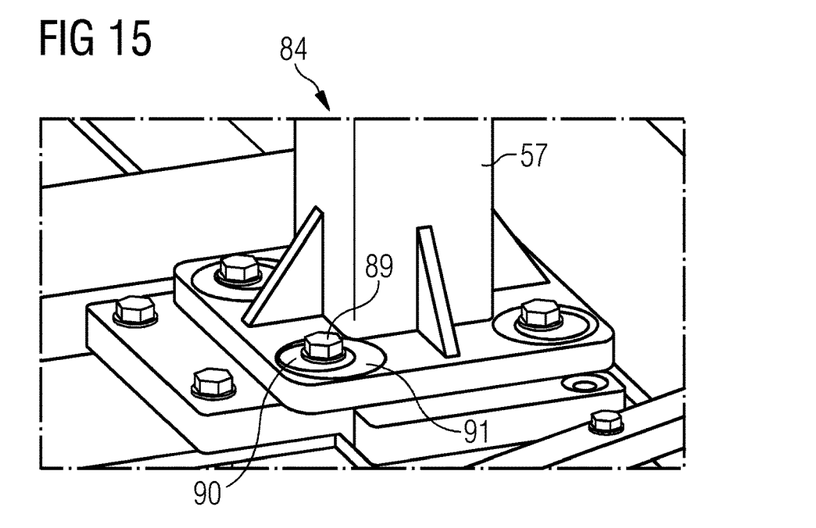
FIG. 15 shows the detail view XV according to FIG. 14.

As can be derived from FIG. 15, two eccentric fixings 90, 91 are assigned to each bolt 89. There is provided a first eccentric fixing 90 in the form of an eccentric plate that receives the bolt 89 and second eccentric fixing 91 in the form of an eccentric plate that receives the first eccentric fixing 90. The eccentric fixings 90, 91 are used to adjust the support struts 57 to 60 in the width direction x and in the depth direction y.

Now returning back to FIG. 14, the skidding system 84 has low friction pads 92, 93 that are attached to the beams 48. The low friction pads 92, 93 can be made of polytetrafluoroethylene (PTFE) or any other suitable material. Further, there are provided sliding brackets 94 that are placed between the beams 86 of the frame 85 and the low friction pads 92, 93. The sliding brackets 94 can slide on the low friction pads 92, 93. The sliding brackets 94 can have a rectangular cross-section. The sliding brackets 94 can be mounted to the beams 86. The skidding system 84 further has clamps 95 that are fixed with bolts 96 to the frame 85. The clamps 95 can hold the frame 85 during mounting the sliding brackets 94.

When supporting the frame 85 at the beams 48, it is desirable to use a plain bearing in the form of the low friction pads 92, 93 and the sliding brackets 94 instead of wheels which generate point loads on the flanges of the beams 48 and which can get stuck with dirt, stones or the like. The low friction pads 92, 93 are used both in vertical and horizontal support of the frame 85 to avoid the structure getting jammed.

Figure 16:
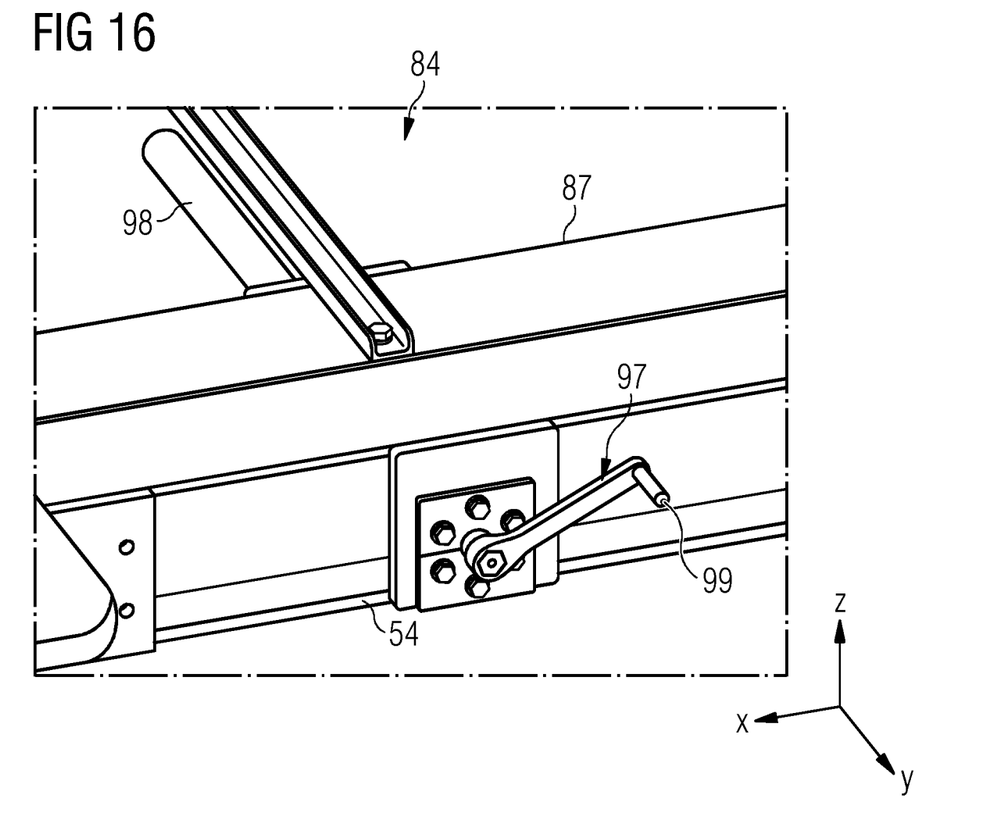
FIG. 16 shows a further partial perspective view of the skidding system according to FIG. 14.

FIG. 16 shows another partial perspective view of the skidding system 84.

The skidding system 84 has an actuation device 97. The actuation device 97 comprises a leadscrew 98 which engages with a nut or the like that is attached to the frame 85. The leadscrew 98 is rotatably supported at or in the beam 54. An actuator 99, in particular a manual actuator, is connected to the leadscrew 98. The actuator 99 can be a crank-handle. By rotating the leadscrew 98, the frame 85 with the support struts 57 to 60 moves along the depth direction y as desired. The leadscrew 98 can also be rotated electrically or hydraulically. However, it is desirable that the actuation device 97 is actuated manually, with the objective to find a low-tech and low-complexity solution, minimizing the risk of failures and maintenance.

The modular tool 19A, 19B, 19C, 19D has the following advantages. Since the modular tool 19A, 19B, 19C, 19D has adjustable support struts 57 to 60, it is suitable for accommodating different designs of the platform 16. Since the modular tool 19A, 19B, 19C, 19D has a height of 1 m underneath the flange 13 of the tower section 9, access is even granted for tower sections 9 without a door. The body elements 21, 22 of the modular tool 19A, 19B, 19C, 19D are assembled by bolted joints between the beams 53 to 55. Hence, the geometry of the modular tool 19A, 19B, 19C, 19D can be adjusted for multiple tower diameters and different sub-structure arrangements.

The modular tool 19A, 19B, 19C, 19D integrates tower bumpers 40 to 43 which ensure a safe landing of the tower section 9 over the platform 16. The modular tool 19A, 19B, 19C, 19D has the walking platform 77 being elevated up to 500 mm from the foundation 14, so there is no need for hand rails inside the modular tool 19A, 19B, 19C, 19D. Since the modular tool 19A, 19B, 19C, 19D incorporates the skidding system 84, the platform 16 can be horizontally adjusted into the tower section 9. The modular tool 19A, 19B, 19C, 19D can be either stacked on a vessel or dismantled into the body elements 21, 22 which can then be transported by means of a standard truck bed. In this way, the modular tool 19A, 19B, 19C, 19D can be transported at cost effective arrangements either by truck or vessel.

The modular tool 19A, 19B, 19C, 19D eliminates the need for design and production of project-specific equipment. The modular tool 19A, 19B, 19C, 19D also eliminates the need to access the tower section 9 through a door during preassembly. The modular tool 19A, 19B, 19C, 19D minimizes the cost of retro-fitting due to the fact that all members are replaceable by modified parts without affecting the rest of the construction. The tower bumpers 40 to 43 protect cabinets and parts of the platform 16 from damage during landing of the tower section 9. Therefore, no staff is required to supervise the landing from underneath the suspended load. The modular tool 19A, 19B, 19C, 19D facilitates adequate working height without the need for hand-rails or other protective means or protective devices against falls. This is an advantage when placing the platform 16 on the structure since there are many items underneath the platform 16.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A modular tool for installing a platform into a tower section of a wind turbine tower, comprising a first body element, a second body element, wherein each body element has a first base plate, on which the tower section rests in use of the modular tool, and a second base plate, which rests on a foundation in use of the modular tool, wherein the base plates are spaced apart from each other and are arranged parallel to each other, at least one connecting beam that detachable connects the body elements to each other and that defines a width of a gap between the body elements, and tower bumpers for guiding the tower section when lowering it to the modular tool, wherein the tower bumpers protrude over the body elements in a height direction of the modular tool.

2. The modular tool according to claim 1, wherein the body elements are arc-shaped.

3. The modular tool according to claim 1, wherein each body element comprises a plurality of beams that connect the base plates to each other.

4. The modular tool according to claim 1, wherein each body element has a plurality of beams that are arranged framework-shaped, and wherein the at least one connecting beam connects two of these beams together.

5. The modular tool according to claim 1, further comprising support struts for supporting the platform, wherein the support struts protrude over the body elements in the height direction.

6. The modular tool according to claim 5, wherein the tower bumpers protrude further over the body elements than the support struts.

7. The modular tool according to claim 5, wherein the support struts are adjustable in the height direction, in at least one of width direction and in a depth direction of the modular tool.

8. The modular tool according to claim 7, further comprising a skidding system for adjusting the support struts in the depth direction.

9. The modular tool according to claim 8, wherein the skidding system comprises a frame, that carries the support struts and that is supported by the body elements, and an actuation device for moving the frame along the depth direction.

10. The modular tool according to claim 1, further comprising pivotable adjustment devices on which the tower section rests in use of the modular tool.

11. The modular tool according to claim 10, wherein each adjustment device comprises an adjustable bolt that is received in a flange of the tower section.

12. The modular tool according to claim 1, further comprising a sliding guide system that allows a linear movement of the tower section relatively to the modular tool.

13. The modular tool according to claim 1, further comprising stairs that are reachable through the gap.

14. The modular tool according to claim 1, further comprising a walking platform that is arranged between the base plates.

* * * * *